(12) United States Patent
Schaefer et al.

(10) Patent No.: US 11,613,672 B2
(45) Date of Patent: Mar. 28, 2023

(54) AQUEOUS EMULSIONS OF OXAMIDOESTER-FUNCTIONALIZED ORGANOPOLYSILOXANES

(71) Applicant: WACKER CHEMIE AG, Munich (DE)

(72) Inventors: Oliver Schaefer, Burghausen (DE); Petra Gratzl, Tuessling (DE)

(73) Assignee: WACKER CHEMIE AG, Munich (DE)

( * ) Notice: Subject to any disclaimer, the term of this patent is extended or adjusted under 35 U.S.C. 154(b) by 121 days.

(21) Appl. No.: 16/755,071

(22) PCT Filed: Aug. 10, 2018

(86) PCT No.: PCT/EP2018/071810
§ 371 (c)(1),
(2) Date: Apr. 9, 2020

(87) PCT Pub. No.: WO2020/030288
PCT Pub. Date: Feb. 13, 2020

(65) Prior Publication Data
US 2021/0155757 A1    May 27, 2021

(51) Int. Cl.
*C09D 183/08* (2006.01)
*C08G 77/388* (2006.01)
*C08J 3/05* (2006.01)
*D06M 15/643* (2006.01)

(52) U.S. Cl.
CPC .......... *C09D 183/08* (2013.01); *C08G 77/388* (2013.01); *C08J 3/05* (2013.01); *C08J 2383/08* (2013.01); *C08J 2483/08* (2013.01); *D06M 15/643* (2013.01)

(58) Field of Classification Search
CPC .............................. C08G 77/26; C08G 77/388
See application file for complete search history.

(56) References Cited

U.S. PATENT DOCUMENTS

| | | | | |
|---|---|---|---|---|
| 5,039,738 | A * | 8/1991 | Czech | D01F 11/14 524/588 |
| 5,302,659 | A * | 4/1994 | Bindl | D06M 15/6433 524/588 |
| 6,294,608 | B1 * | 9/2001 | Hager | C09K 3/18 106/287.11 |
| 7,501,184 | B2 | 3/2009 | Leir et al. | |
| 2007/0149745 | A1 | 6/2007 | Leir et al. | |
| 2015/0043279 | A1 | 2/2015 | Yamauchi | |
| 2017/0362391 | A1 | 12/2017 | Yang et al. | |

FOREIGN PATENT DOCUMENTS

| | | |
|---|---|---|
| EP | 1963404 B1 | 4/2011 |
| WO | 07075317 A1 | 7/2007 |
| WO | 13153853 A1 | 10/2013 |
| WO | WO 2017/182061 * | 10/2017 |

OTHER PUBLICATIONS

Hans-Dieter Dorfler, Grenzflächen- und Kolloidchemie, VCH, Weinheim, 1994, S. 198.
Ullmann's Encyclopedia—Emulsions.
G. Engelhardt, H. Jancke, J. Organom et al. Chem. 28 (1971), 293-300.
Elizabeth A. Williams_Chapter 8—NMR Spectroscopy of organosilicon compounds, S. 511-533.

* cited by examiner

*Primary Examiner* — Marc S Zimmer
(74) *Attorney, Agent, or Firm* — Brooks Kushman P.C.

(57) ABSTRACT

Aqueous emulsions contain (A) oxamidoester-functionalized organopolysiloxanes having units of the formula $$R^1_a(OR^2)_b Z_c SiO_{(4-a-b-c)/2} \qquad (I)$$

where
Z is a group of the formula $$-Y-NR^x-CO-CO-O-R^3 \qquad (II),$$

with the proviso that the sum a+b+c is ≤3 and each molecule contains at least one radical Z.
(B) emulsifiers and
(C) water.

10 Claims, No Drawings

AQUEOUS EMULSIONS OF OXAMIDOESTER-FUNCTIONALIZED ORGANOPOLYSILOXANES

CROSS REFERENCE TO RELATED APPLICATIONS

This application is the U.S. National Phase of PCT Appln. No. PCT/EP2018/071810 filed Aug. 10, 2018, the disclosure of which is incorporated in its entirety by reference herein.

BACKGROUND OF THE INVENTION

1. Field of the Invention

The invention relates to aqueous emulsions of oxamidoester-functionalized organopolysiloxanes, to the preparation thereof and to the use thereof.

2. Description of the Related Art

The chemical group —NR'—CO—CO—OR' is often referred to as a 2-amino-2-oxoacetate or oxamide group or as an oxamidoester group, with the term oxamidoester being used to refer to this group hereinafter. The combination of the half-ester structure with an oxo group means that oxamidoesters have the advantage of being more reactive than amides or carbamates, especially when reacting with amines or alcohols. They are, however, appreciably more stable than isocyanate structures; for example, they do not dimerize or trimerize and are appreciably less reactive, which makes reaction control with these groups much more straightforward.

Oxamidoester-functional polysiloxanes can be used in many fields of application, but especially in the preparation of block copolymers of thermoplastic siloxanes, as described for example in EP-A 1963404. The preparation of such oxamidoester-functional siloxanes is known in principle and described in US-A 2007/0149745. This methodology uses as starting products bisaminoalkyl-functional siloxanes, which can be prepared by various methods. The organopolysiloxanes (I) functionalized with oxamidoester groups of the formula (II) that are used according to the invention may be prepared by the method described in U.S. Pat. No. 7,501,184 B2 (incorporated by reference), in particular column 13, lines 14 to 48.

A disadvantage of these products is the fact that higher-molecular-weight representatives of this product class in particular have very high viscosities, which makes processing in industrial processes difficult. The wetting behaviour of this product class is also adversely affected by the high viscosity, which is a particular disadvantage when wetting highly structured surfaces or fibrous structures. Dilution with organic solvents to reduce the viscosity is often disadvantageous here, because these must then be removed by usually laborious industrial processes.

The problem addressed is therefore that of providing formulations based on oxamidoester-functional siloxanes, the processing viscosity of which can be variably controlled across a wide range independently of their molecular weight, in order to make them easier to process industrially. At the same time, the reactivity of the oxamido ester groups should not be adversely affected in the formulations used.

SUMMARY OF THE INVENTION

It has been found that, surprisingly, aqueous emulsions of oxamidoester-functionalized organopolysiloxanes can be prepared in such a way that allows even higher-molecular-weight products to be processed with low viscosities, but without the water that is present impacting subsequently on the reactivity of the oxamidoester group.

These emulsions show little or no change in viscosity even after storage.

The invention further provides aqueous emulsions comprising (A) oxamidoester-functionalized organopolysiloxanes comprising units of the formula $$R^1_a(OR^2)_b Z_c SiO_{(4-a-b-c)/2} \qquad (I)$$

where
$R^1$ may be identical or different and represents a monovalent, optionally substituted, SiC-bonded hydrocarbon radical,
$R^2$ may be identical or different and represents a hydrogen atom or a monovalent, optionally substituted hydrocarbon radical,
a is 0, 1, 2 or 3, preferably 1 or 2,
b is 0, 1, 2 or 3, preferably 0,
c is 0 or 1 and
Z is a group of the formula $$-Y-NR^x-CO-CO-O-R^3 \qquad (II),$$

where
$R^3$ represents a hydrogen atom or monovalent, optionally substituted hydrocarbon radicals that may be interrupted by oxygen atoms,
$R^x$ represents a hydrogen atom or optionally substituted hydrocarbon radicals and
Y represents divalent, optionally substituted hydrocarbon radicals that may be interrupted by oxygen atoms,
with the proviso that the sum a+b+c is ≤3 and each molecule contains at least one radical Z,
(B) emulsifiers and
(C) water.

DETAILED DESCRIPTION OF THE PREFERRED EMBODIMENTS

Examples of hydrocarbon radicals $R^1$ are alkyl radicals such as the methyl, ethyl, n-propyl, isopropyl, n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trime-thylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, and p-tolyl radicals, xylyl radicals and ethylphenyl radicals; or aralkyl radicals such as the benzyl radical or α- and β-phenylethyl radicals.

The radical $R^1$ preferably represents SiC-bonded hydrocarbon radicals having 1 to 18 carbon atoms, optionally substituted with halogen atoms or hydroxy groups, preferably a hydrocarbon radical having 1 to 12 carbon atoms, more preferably an aliphatic hydrocarbon radical having 1 to 12 carbon atoms, and in particular the methyl, ethyl, octyl or dodecyl radical, most preferably the methyl radical.

Examples of radical $R^2$ are the radicals listed for radical $R^1$ and also polyalkylene glycol radicals bonded via a carbon atom or a hydrogen atom.

The radical $R^2$ preferably represents hydrocarbon radicals, more preferably hydrocarbon radicals having 1 to 8 carbon atoms, in particular the methyl, ethyl or propyl radical.

Examples of radical $R^3$ are the radicals listed for radical $R^1$ and also polyalkylene glycol radicals bonded via a carbon atom or a hydrogen atom.

The radical $R^3$ preferably represents hydrocarbon radicals, more preferably hydrocarbon radicals having 1 to 8 carbon atoms, and in particular the methyl, ethyl or propyl radical.

Examples of radical $R^x$ are a hydrogen atom or the radicals listed for radical $R^1$.

Preferably, radical $R^x$ represents a hydrogen atom or hydrocarbon radicals optionally substituted with —CN or -halogen, preferably a hydrogen atom or alkyl groups, more preferably a hydrogen atom or linear alkyl groups having 1 to 6 carbon atoms, in particular a hydrogen atom, the methyl or ethyl radical, most preferably a hydrogen atom.

Examples of radical Y are aliphatically saturated or unsaturated, straight-chain or branched radicals, which may be substituted with halogen atoms.

Radical Y is preferably an alkylene radical having 3 to 6 carbon atoms, which may be optionally substituted, in particular with fluorine or chlorine. Preferably radical Y is a propylene or butylene radical, in particular a propylene radical.

The siloxanes (A) used according to the invention may be formed from different units, for example M units such as $[R^1_2 (OR^2) SiO_{1/2}]$ and/or $[R^1_2ZSiO_{1/2}]$, D units such as $[R^1_2SiO_{2/2}]$ and/or $[(OR^2) ZSiO_{2/2}]$ and/or T units $[ZSiO_{3/2}]$ and/or $[R^1SiO_{3/2}]$, and optionally Q units $[SiO_{4/2}]$, with the proviso that each molecule contains at least one structural unit having a group Z, where $R^1$, $R^2$ and Z are as defined above.

The siloxanes (A) used according to the invention are preferably oxamidoester-functionalized polydiorganosiloxanes of the following formula $$[R^1_2ZSiO_{1/2}]_2[R^1_2SiO_{2/2}]_m \quad (III),$$

where
$R^1$, $R^2$ and Z are as defined above,
m is an integer and is at least 30.

Although not shown in formula (III), the siloxanes (A) used according to the invention may, as a consequence of the preparation process, have a molar proportion of branching units, i.e. T and/or Q units, that is to say where $R^1$ represents a siloxanyl radical, of preferably up to 1%, more preferably up to 1000 ppm, and in particular, none.

Index m preferably has a value of 30 to 2000, more preferably of 65 to 800, and in particular of 110 to 600.

Index m in formula (III) is preferably chosen such that the viscosity of the oxamidoester-functionalized polydiorganosiloxanes (A) used is preferably not less than 50 mPas, more preferably not less than 100 mPas, yet more preferably not less than 250 mPas, in each case measured at 25° C. and a shear rate of 10/s, and preferably not more than 100,000 mPas, more preferably not more than 50,000 mPas, yet more preferably not more than 10,000 mPas, in each case measured at 25° C. and a shear rate of 10/s.

Examples of siloxanes (A) used according to the invention are
Et—O—CO—CO—NH—$C_3H_6$—SiMe$_2$—[OSiMe$_2$]$_{10}$—O—SiMe$_2$—$C_3H_6$—NH—CO—CO—O—Et,
Me—O—CO—CO—NH—$C_3H_6$—SiMe$_2$—[OSiMe$_2$]$_{10}$—O—SiMe$_2$—$C_3H_6$—NH—CO—CO—O—Me,
Et—O—CO—CO—NH—$C_3H_6$—SiMe$_2$—[OSiMe$_2$]$_{50}$—O—SiMe$_2$—$C_3H_6$—NH—CO—CO—O—Et,
Me—O—CO—CO—NH—$C_3H_6$—SiMe$_2$—[OSiMe$_2$]$_{50}$—O—SiMe$_2$—$C_3H_6$—NH—CO—CO—O—Me,
Et—O—CO—CO—NH—$C_3H_6$—SiMe$_2$—[OSiMe$_2$]$_{200}$—O—SiMe$_2$—$C_3H_6$—NH—CO—CO—O—Et,
Me—O—CO—CO—NH—$C_3H_6$—SiMe$_2$—[OSiMe$_2$]$_{200}$—O—SiMe$_2$—$C_3H_6$—NH—CO—CO—O—Me,
Et—O—CO—CO—NH—$C_3H_6$—SiMe$_2$—[OSiMe$_2$]$_{600}$—O—SiMe$_2$—$C_3H_6$—NH—CO—CO—O—Et,
Me—O—CO—CO—NH—$C_3H_6$—SiMe$_2$—[OSiMe$_2$]$_{600}$—O—SiMe$_2$—$C_3H_6$—NH—CO—CO—O—Me,
Et—O—CO—CO—NH—$C_3H_6$—SiMe$_2$—[OSiMe$_2$]$_{30}$[OSiMeC$_6$H$_5$]$_{20}$—O—SiMe$_2$—$C_3H_6$—NH—CO—CO—O—Et,
Me—O—CO—CO—NH—$C_3H_6$—SiMe$_2$—[OSiMe$_2$]$_{30}$[OSiMeC$_6$H$_5$]$_{20}$—O—SiMe$_2$—$C_3H_6$—NH—CO—CO—O—Me,
Et—O—CO—CO—NH—$C_3H_6$—SiMe$_2$—[OSiMe$_2$]$_{120}$[OSiMeC$_6$H$_5$]$_{60}$—O—SiMe$_2$—$C_3H_6$—NH—CO—CO—O—Et,
Me—O—CO—CO—NH—$C_3H_6$—SiMe$_2$—[OSiMe$_2$]$_{120}$[OSiMeC$_6$H$_5$]$_{60}$—O—SiMe$_2$—$C_3H_6$—NH—CO—CO—O—Me,
Me$_3$Si—[OSiMe$_2$]$_{60}$[OSiMeC$_3$H$_6$—NH—CO—CO—O—Me]$_{10}$—O—SiMe$_3$,
Me$_3$Si—[OSiMe$_2$]$_{60}$[OSiMeC$_3$H$_6$—NH—CO—CO—O—Et]$_{10}$—O—SiMe$_3$,
Me—O—CO—CO—NH—$C_3H_6$—SiMe$_2$—[OSiMe$_2$]$_{60}$[OSiMeC$_3$H$_6$—NH—CO—CO—O—ME]$_{10}$—O—SiMe$_2$—$C_3H_6$—NH—CO—CO—O—Me and
Et—O—CO—CO—NH—$C_3H_6$—SiMe$_2$—[OSiMe$_2$]$_{60}$[OSiMe$_3$H$_6$NH—CO—CO—O—Et]$_{10}$—O—SiMe$_2$—$C_3H_6$—NH—CO—CO—O—Et,
where Me represents a methyl radical and Et an ethyl radical.

The siloxanes (A) used according to the invention are preferably oxamidoester-functionalized polydiorganosiloxanes such as
Et—O—CO—CO—NH—$C_3H_6$—SiMe$_2$—[OSiMe$_2$]$_{10}$—O—SiMe$_2$—$C_3H_6$—NH—CO—CO—O—Et,
Et—O—CO—CO—NH—$C_3H_6$—SiMe$_2$—[OSiMe$_2$]$_{50}$—O—SiMe$_2$—$C_3H_6$—NH—CO—CO—O—Et,
Et—O—CO—CO—NH—$C_3H_6$—SiMe$_2$—[OSiMe$_2$]$_{200}$—O—SiMe$_2$—$C_3H_6$—NH—CO—CO—O—Et,
Et—O—CO—CO—NH—$C_3H_6$—SiMe$_2$—[OSiMe$_2$]$_{600}$—O—SiMe$_2$—$C_3H_6$—NH—CO—CO—O—Et.

The organosiloxanes (A) are commercially available products or they may be prepared by methods that are standard in silicon chemistry.

The emulsions of the invention preferably contain siloxanes (A) in amounts of 5% to 50% by weight, more preferably 10% to 50% by weight.

All previously known nonionic, ampholytic, anionic or cationic emulsifiers or mixtures thereof may be used as emulsifiers (B).

Particularly suitable anionic emulsifiers are:
1. alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO)/propylene oxide (PO)units;
2. sulfonates, in particular alkyl sulfonates having 8 to 18 carbon atoms, alkylaryl sulfonates having 8 to 18 carbon atoms, taurates, esters and half-esters of sulfosuccinic acid with monohydric alcohols or alkylphenols having 4 to 15 carbon atoms; these alcohols or alkylphenols may optionally also be ethoxylated with 1 to 40 EO units;

3. alkali metal and ammonium salts of carboxylic acids having 8 to 20 carbon atoms in the alkyl, aryl, alkaryl or aralkyl radical; or
4. partial phosphoric esters and their alkali metal and ammonium salts, in particular alkyl and alkaryl phosphates having 8 to 20 carbon atoms in the organic radical and also alkyl ether phosphates and alkaryl ether phosphates having 8 to 20 carbon atoms in the alkyl or alkaryl radical and 1 to 40 EO units.

Particularly suitable nonionic emulsifiers are:
5. polyvinyl alcohol additionally having 5% to 50%, preferably 8% to 20%, of vinyl acetate units, and having a degree of polymerization of 500 to 3000;
6. alkyl polyglycol ethers, preferably those having 8 to 40 EO units and alkyl radicals of 8 to 20 carbon atoms;
7. alkylaryl polyglycol ethers, preferably those having 8 to 40 EO units and 8 to 20 carbon atoms in the alkyl and aryl radicals;
8. ethylene oxide/propylene oxide (EO/PO) block copolymers, preferably those having 8 to 40 EO/PO units;
9. addition products of alkyl amines having alkyl radicals of 8 to 22 carbon atoms with ethylene oxide or propylene oxide;
10. fatty acids having 6 to 24 carbon atoms;
11. alkyl polyglycosides of general formula R*—O—Zo, where R* represents a linear or branched, saturated or unsaturated alkyl radical having an average of 8-24 carbon atoms and Zo represents an oligoglycoside radical having an average of o=1-10 hexose or pentose units, or mixtures thereof;
12. natural substances and derivatives thereof, such as lecithin, lanolin, saponins, cellulose; cellulose alkyl ethers and carboxyalkylcelluloses, the alkyl groups of which each contain up to 4 carbon atoms; or
13. polar groups containing linear organo(poly)siloxanes, in particular those containing alkoxy groups having up to 24 carbon atoms and/or up to 40 EO and/or PO groups.

Particularly suitable cationic emulsifiers are:
14. salts of primary, secondary and tertiary fatty amines having 8 to 24 carbon atoms with acetic acid, sulfuric acid, hydrochloric acid and phosphoric acids;
15. quaternary alkylammonium and alkylbenzeneammonium salts, in particular those in which the alkyl groups contain 6 to 24 carbon atoms, in particular halides, sulfates, phosphates and acetates; or
16. alkylpyridinium, alkylimidazolinium and alkyloxazolinium salts, in particular those in which the alkyl chain contains up to 18 carbon atoms, specifically the halides, sulfates, phosphates and acetates.

Particularly suitable ampholytic emulsifiers are:
17. long-chain substituted amino acids, such as N-alkyl-di (ami-noethyl)glycine or N-alkyl-2-aminopropionic acid salts; or
18. betaines, such as N-(3-acylamidopropyl)-N,N-dimethylammonium salts having a C8-C18 acyl radical and alkylimidazolium betaines.

Preferred emulsifiers (B) are nonionic emulsifiers, in particular the alkyl polyglycol ethers listed above under 6, the addition products of alkyl amines with ethylene oxide or propylene oxide listed under 9, the alkyl polyglycosides listed under 11 and the polyvinyl alcohol listed under 5.

The nonionic, polyethylene oxide-containing emulsifiers (B) used in the aqueous emulsions of the invention are preferably those having an HLB value of preferably greater than or equal to 16, more preferably greater than or equal to 17, and at the same time a content of ethylene oxide units of preferably greater than or equal to 45, more preferably greater than or equal to 50, and also preferably less than or equal to 600, more preferably less than or equal to 400, most preferably less than or equal to 250.

The HLB value (HLB=hydrophilic-lipophilic balance) describes the hydrophilic and lipophilic proportion of mainly nonionic surfactants. The HLB value can be calculated for nonionic surfactants as described in Hans-Dieter Dörfler, Grenzflachen and Kolloidchemie [Interfaces and colloid chemistry], VCH, Weinheim, 1994, p. 198.

Examples of nonionic, polyethylene oxide-containing emulsifiers (B) preferably used according to the invention are:
  alkyl polyglycol ethers, preferably those having alkyl radicals of 8 to 20 carbon atoms, for example Steareth-100 (9005-00-9), Talloweth-50, Talloweth-80 (61791-28-4), Trideceth-50 (24938-91-8),
  polyglycol esters of carboxylic acids, in particular polyglycol esters of fatty acids, preferably esters of carboxylic acids having 8 to 20 carbon atoms, for example PEG-75 oleate, PEG-200 oleate, PEG-300 monooleate, PEG-400 oleate, PEG-150 laurate, PEG-400 laurate, PEG-75 stearate, PEG-100 stearate, PEG-600 stearate, PEG-150 distearate,
  ethoxylated sorbitan fatty acid esters, for example PEG-40 sorbitan oleate, PEG-80 sorbitan laurate, —ethoxylated castor oil or hydrogenated variants, for example (names according to INCI nomenclature) PEG 75 Castor Oil or PEG-200 Castor Oil and PEG-80 Hydrogenated Castor Oil, PEG-100 Hydrogenated Castor Oil, PEG-200 hydrogenated Castor Oil,
  ethoxylated fatty amines, for example PEG-100 tallow alkylamine (61791-44-4), PEG-40 stearylamine,
  ethoxylated glyceryl fatty acid carboxylates, for example PEG-40 glyceryl laurate, PEG-200 glyceryl stearate, PEG-200 glyceryl tallowate, PEG-200 hydrogenated glyceryl palmate
  block copolymers of ethylene oxide and propylene oxide units (polyalkylene block polymers such as the so-called poloxamers), for example PEG-PPG-PEG block polymer Pluronic® F-108 (HLB>24; Mn=14 600) (available from Sigma-Aldrich), and
  copolymers of ethylene oxide and propylene oxide units that are bridged by an ethylenediamine core (so-called poloxamines), for example Tetronic 1107 (HLB: 24; Mn≈15 000) (available from Sigma-Aldrich).

The nonionic, polyethylene oxide-containing emulsifiers (B) used according to the invention may consist of one of the abovementioned emulsifiers or of a mixture of two or more of the abovementioned emulsifiers; they may be used in pure form or as solutions of one or more emulsifiers in water or organic solvents.

The emulsions of the invention preferably contain emulsifiers (B) in amounts of 0.5% to 20% by weight, more preferably 1% to 15% by weight, and in particular 2% to 10% by weight.

Examples of water (W) are natural waters such as rain water, groundwater, spring water, river water and sea water, chemical waters such as demineralized water, distilled water or (multiply) redistilled water, water for medical or pharmaceutical purposes such as purified water (aqua purificata; Pharm. Eur. 3), aqua deionisata, aqua destillata, aqua bidestillata, aqua ad injectionam or aqua conservata, drinking water according to the German Drinking Water Ordinance and mineral water.

The water (C) used according to the invention is preferably water having a conductivity of less than 10 μS/cm, in particular less than 2 μS/cm.

The emulsions of the invention preferably contain water (C) in amounts of preferably 1% to 95% by weight, more preferably 5% to 85% by weight, and in particular 10% to 80% by weight.

In addition to components (A), (B) and (C), the aqueous emulsions of the invention may comprise further constituents such as
(D) co-emulsifiers
(E) non-aqueous solvents and
(F) auxiliaries, for example pH regulators, salts, foam inhibitors, thickeners and/or protective colloids, preservatives, disinfectants, wetting agents, corrosion inhibitors, dyes, fragrances or mixtures thereof.

Preferred examples of optionally used co-emulsifiers (D) are 1-alkanols having C5 to C8 chains, alkane diols having a C4 to C8 chain, and also monoalkyl ethers of ethylene glycol, propylene glycol, dipropylene glycol or diethylene glycol.

Particularly preferred optionally used co-emulsifiers (D) are 1-pentanol, 1-hexanol, 1-octanol, 1,3-butanediol, 1,2-hex-anediol, 2-ethylhexane-1,3-diol, 1,2-octanediol, diethylene glycol methyl ether, diethylene glycol ethyl ether, diethylene glycol mono-n-butyl ether or propylene glycol methyl ether.

If component (D) is used, it is preferably present in amounts of 0.1% to 20% by weight, more preferably 0.4% to 15% by weight, and in particular 0.8% to 10% ppm by weight, in each case based on the total amount of the emulsion. The emulsions of the invention preferably contain no component (D).

Examples of optionally used non-aqueous solvents (E) are ethanol, n-propanol or isopropanol, butanols, such as 1-butanol, 2-butanol or 2-methyl-2-propanol, glycol, propanediol, glycerol, 1-butoxyethoxy-2-propanol or 3-methyl-3-methoxybutanol, 1-aminobutane, 2-aminobutane, 2-amino-2-methyl-propane, 1-aminopentane, 2-aminopentane, 1-aminohexane, 1-aminoheptane and 1-aminooctane; ethyl, propyl, isopropyl, butyl, isobutyl, pentyl, isopentyl and hexyl acetate; methyl, ethyl and tert-butyl propionate; methyl, ethyl, propyl and butyl butyrate; 2-butanone, 2-pentanone, 3-pentanone, 4-methyl-2-pentanone, 2-hexanone, 3-hexanone, 2-heptanone, 3-heptanone, 4-heptanone, 5-methyl-3-heptanone, 2-octanone and 3-octanone and also mixtures, preference being given to aliphatic alcohols.

If component (E) is used, it is preferably present in amounts of 0.5% to 20% by weight, more preferably 0.5% to 5% ppm by weight, in each case based on the total amount of the emulsion. The emulsions of the invention preferably contain no component (E).

Examples of optionally used auxiliaries (F) are all known acids or alkalis that can be used as pH regulators, provided the use thereof is not proscribed for performance-related or ecological reasons or for reasons of consumer protection.

Examples of salts (electrolytes) (F) are in particular those from the group of inorganic salts, it being possible to use a wide and very diverse range of salts. Preferred cations here are alkali metals and alkaline earth metals, preferred anions are halides and sulfates. From a production viewpoint, preference is given to using sodium acetate or sodium chloride as component (F) in the aqueous emulsions of the invention.

Examples of foam inhibitors (F) are soaps, paraffins or silicone oils.

Examples of preferred thickeners (F) are modified polysaccharides such as starch, cellulose, gum arabic and guar gums, for example polymers having the INCI names Cellulose Gum, Guar Gum, Xanthan Gum or Cassia Gum. Other examples of thickeners are hydrophobically modified nonionic cellulose derivatives, for example the cellulose derivative having the INCI name Hydroxyethylcellulose. Other examples of thickeners are crosslinked acrylic acid and methacrylic acid polymers and derivatives of crosslinked acrylic acid and methacrylic acid polymers, for example polymers having the INCI name Carbomer. Other examples of thickeners are agents that, in combination with surfactants, achieve a thickening effect. Examples are monoglycerides of fatty acids.

Examples of preservatives (F) are methylisothiazolinone, chloromethylisothiazolinone, benzylisothiazolinone, phenoxyethanol, methylparaben, ethylparaben, propylparaben, butylparaben, isobutylparaben, alkali metal benzoates, alkali metal sorbates, iodopropynyl butylcarbamate, benzyl alcohol and 2-bromo-2-nitropropane-1,3-diol.

If component (F) is used, it is preferably selected from thickeners, pH regulators and preservatives.

If component (F) is used, it is preferably present in amounts of 0.01% to 20% by weight, more preferably 0.1% to 10% by weight, in each case based on the total amount of the emulsion. The emulsions of the invention preferably comprise component (F).

The emulsions of the invention are preferably those comprising
(A) siloxanes comprising units of the formula (I),
(B) nonionic emulsifiers,
(C) water,
optionally (D) co-emulsifiers,
optionally (E) non-aqueous solvents and
optionally (F) auxiliaries selected from pH regulators, salts, foam inhibitors, thickeners and/or protective colloids, preservatives, disinfectants, wetting agents, corrosion inhibitors, dyes, fragrances or mixtures thereof.

The emulsions of the invention are more preferably those comprising
(A) siloxanes comprising units of the formula (I),
(B) nonionic emulsifiers,
(C) water,
optionally (D) co-emulsifiers,
optionally (E) non-aqueous solvents and
(F) auxiliaries selected from pH regulators, salts, foam inhibitors, thickeners and/or protective colloids, preservatives, disinfectants, wetting agents, corrosion inhibitors, dyes, fragrances or mixtures thereof.

The emulsions of the invention are in particular those comprising
(A) siloxanes comprising units of the formula (I),
(B) nonionic emulsifiers,
(C) water,
optionally (D) co-emulsifiers,
optionally (E) non-aqueous solvents and
(F) pH regulators and preservatives.

The components used according to the invention may in each case be a single type of the component concerned or may be a mixture of two or more types of a particular component.

In the emulsions of the invention, the proportion of components (A) to (C) in the total amount of substances used is preferably not less than 80% by weight, more preferably not less than 90% by weight, most preferably not less than 95% by weight.

The emulsions of the invention preferably contain no other constituents over and above components (A) to (F).

The emulsions of the invention have viscosities at 25° C. of preferably not more than 50,000 mPas, more preferably not more than 30,000 mPas, in particular not more than 15,000 mPas.

The emulsions of the invention preferably have particle sizes (D50) of less than or equal to 1000 nm, more preferably less than or equal to 500 nm, most preferably less than or equal to 300 nm.

The emulsions of the invention preferably have a unimodal particle size distribution.

The emulsions of the invention preferably have solids contents of not less than 20% by weight, more preferably not less than 30% by weight, most preferably not less than 40% by weight.

The aqueous emulsions of the invention may be prepared by processes known per se. Usually they are prepared by simply stirring together all the constituents in any desired order, for example at temperatures of preferably 1 to 50° C., optionally followed by homogenization, for example with jet dispersers, rotor-stator homogenizers at circumferential speeds of preferably 5 to 40 m/s, colloid mills or high-pressure homogenizers at homogenization pressures of preferably 50 to 2000 bar.

The present invention further provides a method for preparing the emulsions of the invention by stirring together all the constituents in any desired order.

In a preferred embodiment of the method of the invention, the oxamidoester-functionalized polydiorganosiloxanes (A) are intensively intermixed in water (C) with the emulsifiers (B), optionally the co-emulsifiers (D), optionally the non-aqueous solvent (E) and optionally the auxiliary substances (F).

This results in the formation of stable emulsions in which the oxamidoester-functionalized polydiorganosiloxanes (A) are preferably in finely divided form.

The emulsification process for preparing the aqueous emulsions of oxamidoester-functionalized polydiorganosiloxanes (A) of the invention is preferably carried out at temperatures of 10 to 80° C., more preferably 15 to 70° C. A temperature increase can preferably be effected through the introduction of mechanical shear energy, which is required for the emulsification process. The temperature increase is not, however, required in order to speed up a chemical process.

The method of the invention is preferably performed at ambient pressure, i.e. at 900 to 1100 hPa, but may also be carried out at higher or lower pressures.

The method of the invention may be carried out in a batchwise or continuous process.

Technologies for preparing emulsions of organopolysiloxanes have been known for a long time. For example, intensive mixing and dispersing can be carried out in rotor-stator stirring devices, colloid mills, high-pressure homogenizers, microchannels, membranes, jet nozzles and the like, or by means of ultrasound. Homogenizers and methods are described for example in Ullmann's Encyclopedia of Industrial Chemistry, CD-ROM edition 2003, Wiley-VCH Verlag, under the heading "Emulsions".

Preferred procedures may however arise according to the properties of components (A), (B), optionally (D), optionally (E) and optionally (F).

For example, it may be advantageous to initially charge the emulsifier apparatus with the emulsifiers (B) and optional auxiliary co-emulsifiers (D) plus part of the dispersant water (C) and then to incorporate component (A) and optional further components into the resulting mixture.

The emulsions of the invention are preferably freely flowing and of relatively low viscosity and may be readily diluted with water to form stable further emulsions.

The emulsions of the invention have the advantage that they have good storage stability in both concentrated and diluted form.

In the examples described below, all parts and percentages are by weight unless otherwise stated. Unless otherwise stated, the examples described below are carried out at ambient pressure, i.e. at about 1000 hPa, and at room temperature, i.e. about 20° C. or at the temperature attained on combining the reactants at room temperature without additional heating or cooling.

Viscosities were measured using an Anton Paar MCR 302 rheometer according to DIN EN ISO 3219: 1994 and DIN 53019, using a coneplate system (cone C950-2) having a 2° opening angle. The instrument was calibrated with standard oil 10 000 of the German National Metrology Institute. The measurement temperature is 25.00° C. ±−0.05° C. and the measurement time is 3 min. The reported viscosity is the arithmetic mean of three independently performed individual measurements. The measurement uncertainty of the dynamic viscosity measurement is 1.5%. The shear rate gradient was chosen according to the viscosity and is specified separately for each reported viscosity.

1H-NMR spectra are recorded as solutions in CDC13 on a Bruker Avance 500 NMR spectrometer (5 mm selective 1H-NMR probe) at a measurement frequency of 500.13 MHz. Spectra are evaluated in a manner known to those skilled in the art and as described in the following literature: "Uber die 1H-, 13C- und 29Si-NMR chemischen Verschiebungen einiger linearer, verzweigter und cyclischer Methyl-Siloxan-Verbindungen" [1H-, 13C- and 29Si-NMR chemical shifts of some linear, branched and cyclic methylsiloxane compounds], G. Engelhardt, H. Jancke; J. Organometal. Chem. 28 (1971), 293-300; "Chapter 8—NMR spectroscopy of organosilicon compounds", Elizabeth A. Williams, The Chemistry of Organic Silicon Compounds, 1989 John Wiley and Sons Ltd, 511-533.

Particle sizes were determined on a Zetasizer Nano-S particle size analyser from Malvern, software version 6.01, by dynamic light scattering (measurement by the Mie method). For this, the emulsions were diluted with filtered and degassed water to a solids content of 0.5% by weight. The reported values always refer to the D(50) value. D(50) is to be understood as meaning the volume-averaged particle diameter at which 50% of all measured particles have a volume-average diameter smaller than the specified value D(50).

Polydimethylsiloxane 1: Colourless, clear, transparent bis(ethyloxalatoaminopropyl)-functional silicone oil Et—O—CO—CO—NH—$C_3H_6$—$SiMe_2$—[$OSiMe_2$]$_x$—O—$SiMe_2$—$C_3H_6$—NH—CO—CO—O—Et having an APHA index of 6, a viscosity of 340 mPas, an average molecular weight Mn of 9763 g/mol and a residual Si-OH content of 82 ppm.

Polydimethylsiloxane 2: Colourless, clear, transparent bis(ethyloxalatoaminopropyl)-functional silicone oil Et—O—CO—CO—NH—$C_3H_6$—$SiMe_2$—[$OSiMe_2$]$_x$—O—$SiMe_2$—$C_3H_6$—NH—CO—CO—O—Et having an APHA index of 3, a viscosity of 11 mPas, an average molecular weight Mn of 38,672 g/mol and a residual Si—OH content of 62 ppm.

Emulsifier 1: Aqueous solution of a branched tridecanol ethoxylate having 10 EO units and a solids content of 80%

(commercially available under the name Arlypon IT 10/80 from BASF SE, D-Ludwigshafen);

Emulsifier 2: Isotridecyl alcohol ethoxylate having 5 EO units (commercially available under the name Arlypon IT 5 from BASF SE, D-Ludwigshafen);

Emulsifier 3: Isotridecyl alcohol polyglycol ether having 16 EO units (commercially available under the name Arlypon IT 16 from BASF SE, D-Ludwigshafen);

Preservative 1: 2-Phenoxyethanol.

EXAMPLE 1

7.61 g of emulsifier 1, 6.1 g of emulsifier 2 and 9.99 g of water are homogenized for 1 minute in a high-performance emulsifying apparatus (commercially available under the name Ultra-Turrax T 50 from IKA®-Werke GmbH & Co. KG, Staufen, Germany) set to level 2. To this is then added, in 4 equal parts at intervals of 1 minute, a total of 121.28 g of polydimethylsiloxane 1, with the emulsifying apparatus set to level 3, so as to obtain a homogeneous mixture. This pre-emulsion gives a so-called stiff phase, i.e. a highly viscous mixture. This is then diluted at mixing level 3 with 12×5 ml of water (total volume 60 ml) added at intervals of 1 minute, resulting in the mixture becoming appreciably creamier (less viscous). Finally, this is then further diluted at mixing level 2 with 8×8 ml of water (total volume 64 ml) added at intervals of 1 minute. Lastly, 0.65 g of preservative 1 is also added.

A smooth, creamy white silicone oil emulsion having a solids content of 49.6% is obtained. The particle size distribution is unimodal, with a D50 value of 149 nm. The emulsion remains homogeneous and stable even after storage for 12 months at room temperature.

EXAMPLE 2

8.28 g of emulsifier 3 and 10.71 g of water are homogenized for 1 minute in a high-performance emulsifying apparatus (commercially available under the name Ultra-Turrax T 50 from IKA®—Werke GmbH & Co. KG, Staufen, Germany) set to level 2. To this is then added, in 4 equal parts at intervals of 1 minute, a total of 138.0 g of polydimethylsiloxane 1, with the emulsifying apparatus set to level 3, so as to obtain a homogeneous mixture. An additional 8.28 g of emulsifier 3 is then mixed in. This pre-emulsion gives a so-called stiff phase, i.e. a highly viscous mixture.

This is then diluted at mixing level 3 with 10×5 ml of water (total volume 50 ml) added at intervals of 1 minute, resulting in the mixture becoming appreciably creamier (less viscous).

Finally, this is then further diluted at mixing level 2 with 14×8 ml of water (total volume 112 ml) added at intervals of 1 minute.

A smooth, creamy white silicone oil emulsion having a solids content of 47.2% is obtained. The particle size distribution is unimodal, with a D50 value of 236 nm. The emulsion remains homogeneous and stable even after storage for 12 months at room temperature.

EXAMPLE 3

7.61 g of emulsifier 1, 6.1 g of emulsifier 2 and 9.99 g of water are homogenized for 1 minute in a high-performance emulsifying apparatus (commercially available under the name Ultra-Turrax T 50 from IKA®-Werke GmbH & Co. KG, Staufen, Germany) set to level 2. To this is then added, in 4 equal parts at intervals of 2 minutes, a total of 121.28 g of polydimethylsiloxane 2, with the emulsifying apparatus set to level 3, so as to obtain a homogeneous mixture. This pre-emulsion gives a so-called stiff phase, i.e. a highly viscous mixture. This is then diluted at mixing level 3 with 12×5 ml of water (total volume 60 ml) added at intervals of 1 minute, resulting in the mixture becoming appreciably creamier (less viscous). Finally, this is then further diluted at mixing level 2 with 8×8 ml of water (total volume 64 ml) added at intervals of 1 minute. Lastly, 0.65 g of preservative 1 is also added.

A smooth, creamy white silicone oil emulsion having a solids content of 49.6% is obtained. The particle size distribution is unimodal, with a D50 value of 211 nm. The emulsion remains homogeneous and stable even after storage for 12 months at room temperature.

EXAMPLE 4

8.28 g of emulsifier 3 and 10.71 g of water are homogenized for 1 minute in a high-performance emulsifying apparatus (commercially available under the name Ultra-Turrax T 50 from IKA®—Werke GmbH & Co. KG, Staufen, Germany) set to level 2. To this is then added, in 4 equal parts at intervals of 2 minutes, a total of 138.0 g of polydimethylsiloxane 2, with the emulsifying apparatus set to level 3, so as to obtain a homogeneous mixture. An additional 8.28 g of emulsifier 3 is then mixed in. This pre-emulsion gives a so-called stiff phase, i.e. a highly viscous mixture.

This is then diluted at mixing level 3 with 10×5 ml of water (total volume 50 ml) added at intervals of 1 minute, resulting in the mixture becoming appreciably creamier (less viscous). Finally, this is then further diluted at mixing level 2 with 14×8 ml of water (total volume 112 ml) added at intervals of 1 minute.

A smooth, creamy white silicone oil emulsion having a solids content of 47.2% is obtained. The particle size distribution is unimodal, with a D50 value of 278 nm. The emulsion remains homogeneous and stable even after storage for 12 months at room temperature.

The invention claimed is:

1. Aqueous emulsions comprising:
(A) oxamidoester-functionalized organopolysiloxanes comprising units of the formula $$R^1_a(OR^2)_b Z_c SiO_{(4-a-b-c)/2} \quad (I)$$

where $R^1$ are identical or different and represent a monovalent, optionally substituted, SiC-bonded hydrocarbon radical, $R^2$ are identical or different and represent hydrogen or a monovalent, optionally substituted hydrocarbon radical, a is 0, 1, 2 or 3, b is 0, 1, 2 or 3, c is 0 or 1 and Z is a group of the formula $$-Y-NR^X-CO-CO-O-R^3 \quad (II),$$

where $R^3$ represents hydrogen or a monovalent, optionally substituted hydrocarbon radicas optionally interrupted by oxygen atoms, $R^x$ represents hydrogen or an optionally substituted hydrocarbon radical and Y represents divalent, optionally substituted hydrocarbon radicals optionally interrupted by oxygen atoms, with the proviso that the sum a+b+c is ≤3 and each molecule contains at least one radical Z, (B) emulsifiers, and (C) water; wherein the siloxane (A) is an oxamidoester-functionalized polydiorganosiloxanes of the formula $$[R^1_2ZSiO_{1/2}]_2[R^1_2SiO_{2/2}]_m \qquad (III),$$

where $R^1$, $R^2$ and Z are as defined above, and m is an integer and is at least 30.

2. An aqueous emulsion of claim 1, containing siloxane(s) (A) in amounts of 5% to 50% by weight.

3. An aqueous emulsion of claim 1, wherein the emulsifier(s) (B) is/are nonionic emulsifiers.

4. An aqueous emulsion of claim 1, containing emulsifier(s) (B) in amounts of 0.5% to 20% by weight.

5. An aqueous emulsion according to claim 1, containing water (C) in amounts of 1% to 95% by weight.

6. An aqueous emulsion of claim 1, which is an emulsion comprising
(A) siloxanes comprising units of the formula (I),
(B) nonionic emulsifiers,
(C) water,
optionally (D) co-emulsifiers,
optionally (E) non-aqueous solvents and
optionally (F) one or more auxiliaries selected from the group consisting of pH regulators, salts, foam inhibitors, thickeners and/or protective colloids, preservatives, disinfectants, wetting agents, corrosion inhibitors, dyes, and fragrances.

7. An aqueous emulsion of claim 1, which has a viscosity at 25° C. of not more than 50,000 mPas.

8. An aqueous emulsion of claim 1, having a solids content of not less than 20% by weight.

9. A method for preparing an emulsion of claim 6, comprising stirring together all the constituents in any desired order.

10. The method of claim 9, wherein the oxamidoester-functionalized polydiorganosiloxanes (A) are intensively intermixed in water (C) with the emulsifiers (B), optionally the co-emulsifiers (D), optionally the non-aqueous solvent (E) and optionally the auxiliary substances (F).

* * * * *

UNITED STATES PATENT AND TRADEMARK OFFICE
CERTIFICATE OF CORRECTION

| | |
|---|---|
| PATENT NO. | : 11,613,672 B2 |
| APPLICATION NO. | : 16/755071 |
| DATED | : March 28, 2023 |
| INVENTOR(S) | : Oliver Schaefer et al. |

It is certified that error appears in the above-identified patent and that said Letters Patent is hereby corrected as shown below:

In the Claims

Column 12, Lines 65-66, Claim 1:
After "optionally substituted hydrocarbon"
Delete "radicas" and
Insert -- radicals --.

Signed and Sealed this
Twenty-seventh Day of February, 2024

Katherine Kelly Vidal
*Director of the United States Patent and Trademark Office*